(12) United States Patent
Armstrong

(10) Patent No.: US 6,366,277 B1
(45) Date of Patent: Apr. 2, 2002

(54) CONTAMINANT PROCESSING SYSTEM FOR AN ACOUSTIC TOUCHSCREEN

(75) Inventor: Don Armstrong, Belmont, CA (US)

(73) Assignee: ELO Touchsystems, Inc., Fremont, CA (US)

( * ) Notice: Subject to any disclaimer, the term of this patent is extended or adjusted under 35 U.S.C. 154(b) by 0 days.

(21) Appl. No.: 09/417,872

(22) Filed: Oct. 13, 1999

(51) Int. Cl.$^7$ ................................................ G09G 5/00
(52) U.S. Cl. ...................................... 345/177; 345/173
(58) Field of Search ................................. 345/173, 177

(56) References Cited

U.S. PATENT DOCUMENTS

| | | | |
|---|---|---|---|
| 4,642,423 A | 2/1987 | Adler | |
| 4,644,100 A | 2/1987 | Brenner et al. | |
| 4,645,870 A | 2/1987 | Adler | |
| 4,700,176 A | 10/1987 | Adler | |
| 4,746,914 A * | 5/1988 | Adler | 345/177 |
| 4,791,416 A | 12/1988 | Adler | |
| 4,825,212 A | 4/1989 | Adler et al. | |
| 4,859,996 A | 8/1989 | Adler et al. | |
| 4,880,665 A * | 11/1989 | Adler et al. | 427/126.3 |
| RE33,151 E | 1/1990 | Adler | |
| 5,072,427 A | 12/1991 | Knowles | |
| 5,162,618 A | 11/1992 | Knowles | |
| 5,177,327 A | 1/1993 | Knowles | |
| 5,243,148 A | 9/1993 | Knowles | |
| 5,260,521 A | 11/1993 | Knowles | |
| 5,329,070 A | 7/1994 | Knowles | |
| 5,334,805 A * | 8/1994 | Knowles et al. | 178/18 |
| 5,573,077 A | 11/1996 | Knowles | |
| 5,591,945 A | 1/1997 | Kent | 178/19 |
| 5,638,093 A * | 6/1997 | Takahashi et al. | 345/173 |
| 5,708,461 A | 1/1998 | Kent | |
| 5,739,479 A | 4/1998 | Davis-Cannon et al. | |
| 5,784,054 A * | 7/1998 | Armstrong et al. | 345/177 |
| 5,825,352 A | 10/1998 | Bisset et al. | |
| 5,854,450 A * | 12/1998 | Kent | 178/18.04 |
| 6,091,406 A * | 7/2000 | Kambara et al. | 345/177 |
| 6,208,330 B1 * | 3/2001 | Hasegawa et al. | 345/173 |
| 6,236,391 B1 * | 5/2001 | Kent et al. | 345/177 |

OTHER PUBLICATIONS

Patent Abstracts of Japan, vol. 1995. No. 11, Dec. 26, 1995 & JP 07 230352 A (Hitachi Ltd.), Aug. 29, 1995 (1995–08029) abstract.

* cited by examiner

Primary Examiner—Almis R. Jankus
Assistant Examiner—Henry N. Tran

(57) ABSTRACT

A method for minimizing the shadowing effects of a contaminant on a surface acoustic wave touchscreen is provided. The disclosed system compares the measured waveform against a baseline waveform for each axis and validates the new touch if the measured waveform is different from the baseline waveform for either axis. As a consequence of this approach, even if the new touch lies within the shadow created by a contaminant in one axis, the new touch is still validated as it is not within the shadow created by the contaminant in the second axis. In one embodiment, after the system determines that the measured response is different from the baseline in at least one axis, the system compares the new touch to one or more selection criteria to insure that it is a valid touch and not due to a contaminant, electrical noise, or other improper source. Preferably the duration of the new touch is monitored, thus allowing the new touch to be invalidated if the duration is too short, indicating system noise, or too long, indicating for example, a contaminant. Also preferably the size of the new touch is determined, thus allowing the touch to be invalidated if the size is too large which may be indicative of a contaminant or other foreign body resting on the touchscreen surface.

15 Claims, 8 Drawing Sheets

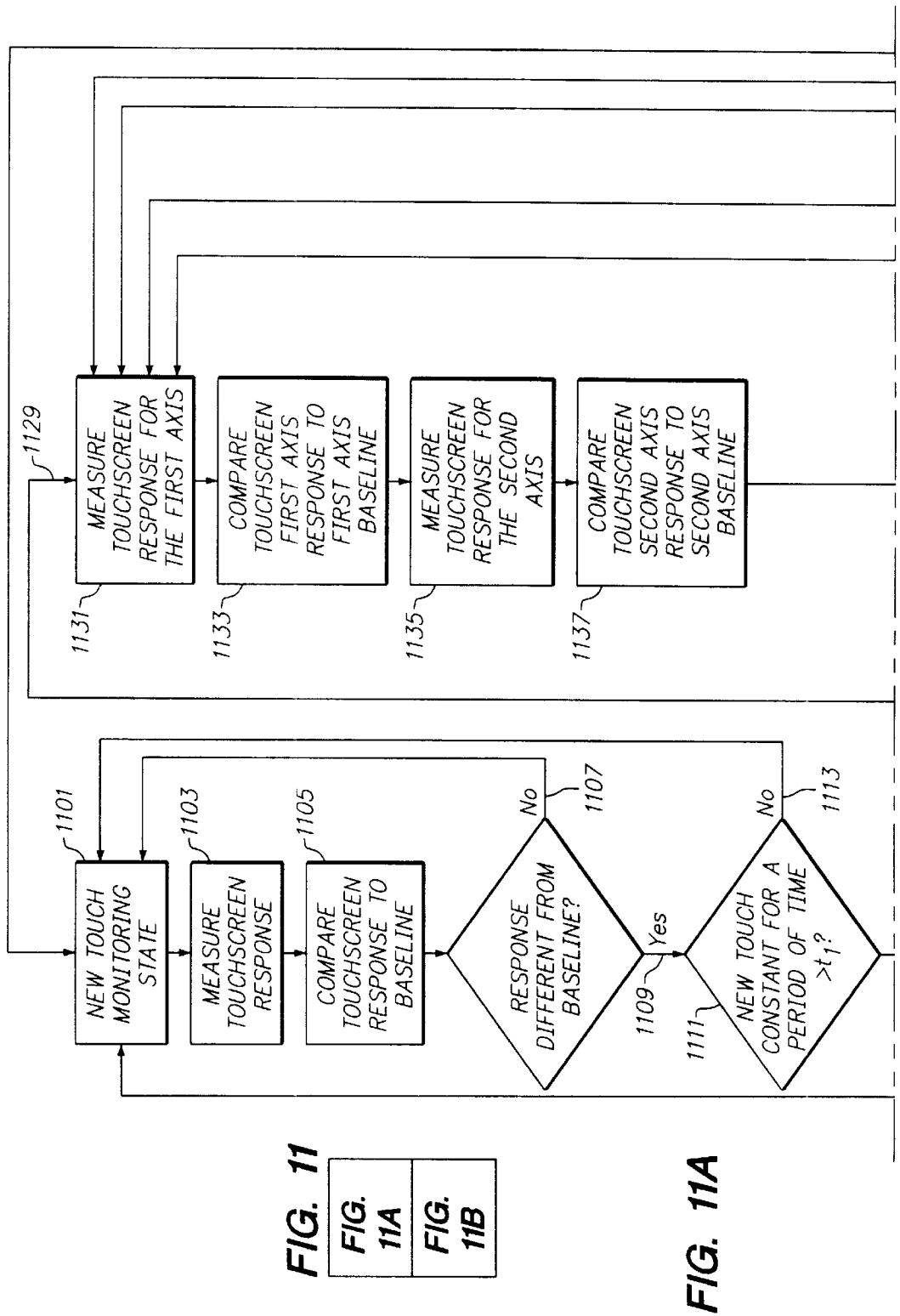

CONTAMINANT PROCESSING SYSTEM FOR AN ACOUSTIC TOUCHSCREEN

TECHNICAL FIELD OF THE INVENTION

The present invention relates generally to touchscreens and, more particularly, to a method for minimizing the impact of surface contaminants on the operation of an acoustic touch sensor.

BACKGROUND OF THE INVENTION

Touchscreens are used in conjunction with a variety of display types, including cathode ray tubes (i.e., CRTs) and liquid crystal display screens (i.e., LCD screens), as a means of inputting information into a data processing system. When placed over a display or integrated into a display, the touchscreen allows a user to select a displayed icon or element by touching the screen in a location corresponding to the desired icon or element. Touchscreens have become common place in a variety of different applications including, for example, point-of-sale systems, information kiosks, automated teller machines (i.e., ATMs), data entry systems, gaming machines, ticketing machines, etc.

A specific type of touchscreen, an acoustic touchscreen, has a touch-sensitive area on which the occurrence and location of a touch is sensed via the touch's effect on acoustic waves propagating across the touchscreen surface. A common type of acoustic touchscreen employs Rayleigh waves (a term which, as used herein, subsumes quasi-Rayleigh waves). Illustrative disclosures relating to Rayleigh wave touchscreens include Adler, U.S. Pat. Nos. 4,642,423; 4,645,870; 4,700,176; 4,746,914; 4,791,416; and U.S. Pat. No. Re 33,151; Adler et al., U.S. Pat. Nos. 4,825,212; 4,859,996; and 4,880,665; Brenner et al., U.S. Pat. No. 4,644,100; Davis-Cannon et al., U.S. Pat. No. 5,739,479; and Kent, U.S. Pat. Nos. 5,708,461 and 5,854,450. Acoustic touchscreens employing other types of acoustic waves such as Lamb or shear waves, or combinations of different types of acoustic waves (including combinations involving Rayleigh waves) are also known, illustrative disclosures including Kent, U.S. Pat. Nos. 5,591,945 and 5,854,450; Knowles, U.S. Pat. Nos. 5,072,427; 5,162,618; 5,177,327; 5,243,148; 5,329,070; and 5,573,077; and Knowles et al., U.S. Pat. No. 5,260,521. The documents cited in this paragraph are incorporated herein by reference for all purposes.

Touchscreen applications may require that the touchscreen operate in an outdoor environment or in a relatively harsh indoor environment such as a factory or restaurant. Therefore the touchscreen may be subjected to a variety of contaminants. Unfortunately, when a surface contaminant, e.g., water, chewing gum, etc., touches the surface of an acoustic touchscreen, the system may register the contaminant as a valid touch. Unless the system recognizes that the touch is a false touch, for example by determining that the touch location remains unchanged for an extended period of time, the touchscreen may become inoperable and unable to register further touches. Even if the system recognizes that the touch is due to a contaminant, in a conventional touchscreen system typically a pair of dead zones will be created based on the coordinates of the contaminant. Consequently, regions of the touchscreen become unusable, thus compromising the performance of the touchscreen.

What is needed in the art is a method for minimizing the impact of contaminants on the performance of an acoustic touchscreen. The present invention provides such a method.

SUMMARY OF THE INVENTION

The present invention provides a method for distinguishing between contaminants and valid touches in a surface acoustic wave touchscreen. The system compares the measured waveform against a baseline waveform for each axis and validates the new touch if the measured waveform is different from the baseline waveform for either axis. Therefore even if the new touch lies within the shadow created by a contaminant in one axis, the new touch is still validated as it is not within the shadow created by the contaminant in the second axis.

In one embodiment of the invention, after the system determines that the measured response is different from the baseline in at least one axis, the system compares the new touch to one or more selection criteria to insure that it is a valid touch and not due to a contaminant, electrical noise, or other invalid source. Preferably the duration of the new touch is monitored, thus allowing the new touch to be invalidated if the duration is too short, indicating system noise, or too long, indicating, for example, a contaminant. Also preferably the size of the new touch is determined, thus allowing the touch to be invalidated if the size is too large, possibly being indicative of a contaminant or other foreign body resting on the touchscreen surface.

A further understanding of the nature and advantages of the present invention may be realized by reference to the remaining portions of the specification and the drawings.

DESCRIPTION OF THE SPECIFIC EMBODIMENTS

Figure 1:
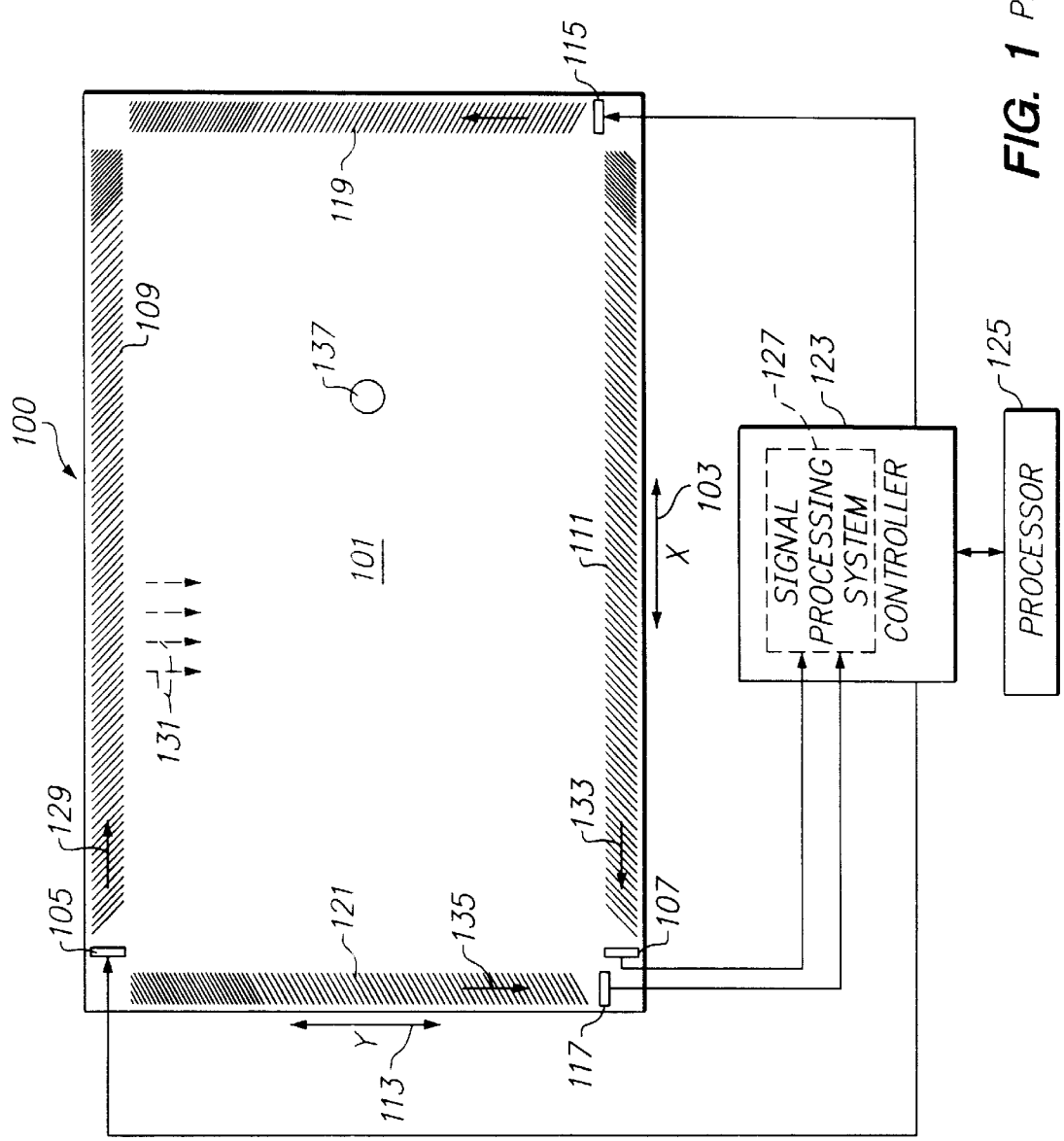
FIG. 1 is an illustration of a touchscreen utilizing surface acoustic waves according to the prior art.

FIG. 1 is an illustration of a touchscreen 100 utilizing surface acoustic waves according to the prior art. This type of touchscreen is suitable for use with a cathode ray tube (i.e., CRT) display, liquid crystal display (i.e., LCD), plasma display, electroluminescent display, or other display type.

Surface acoustic wave touchscreens are disclosed in U.S. Pat. Nos. 4,644,100, 4,700,176, 5,708,461, 5,854,450, and U.S. Pat. No. Re. 33,151, the complete disclosures of which are incorporated herein for all purposes. Surface acoustic wave touchscreens will be discussed briefly herein, thus allowing a fuller understanding of the present invention.

Touchscreen 100 includes a surface 101 suitable for propagating surface acoustic waves, e.g., Rayleigh waves, Love waves, and other waves sensitive to a touch on the surface. Surface 101 can either be an overlay touchscreen, i.e., fabricated on a separate substrate (e.g., a glass substrate) that is mounted over a display panel or it can be a direct-on-tube touchscreen, i.e., fabricated directly onto the face of the display panel (e.g., a CRT panel). To determine touch coordinates along an x-axis 103, a system is used that includes a transmitter transducer 105, a receiver transducer 107, and a pair of associated reflective arrays 109 and 111, respectively. A similar system is used to determine coordinates along a y-axis 113 which includes a transmitter transducer 115, a receiver transducer 117, and associated reflective arrays 119 and 121. Transmitter transducers 105 and 115 are coupled to a controller 123, typically under the control of a processor 125. Receiver transducers 107 and 117 are also coupled to controller 123 which includes a signal processing system 127. Although a signal may be simultaneously applied to transducers 105 and 115, preferably the signals to the transducers are sequential, thus reducing interference and cross-talk between the two coordinate sensing channels. The sequential sensing approach also reduces circuit complexity as many of the necessary circuits can be alternately used in the two sensing channels thereby eliminating the need for unnecessary circuit duplication. In order to further reduce circuit complexity, typically the prior art sends the same frequency burst to both transmitter transducers 105 and 115.

One of the sensing channels will now be described in further detail. The description of this channel is equally applicable to the second sensing channel. In order to determine a touch coordinate along x-axis 103 for substrate 101, transmitter transducer 105 sends a burst acoustic wave along a path 129. Reflective array 109 includes a plurality of reflective elements that are disposed along path 129, each element oriented at an approximately 45 degree angle to path 129. The reflective elements are designed to extract a plurality of wave components 131 from the acoustic wave traveling along path 129, transmitting components 131 along the surface of the touchscreen, preferably in a direction parallel to y-axis 113. The pattern design for array 109 is such that the individual acoustic components 131 reflected by the individual reflectors coherently add together, thus creating a substantially planar waveform with uniform amplitude. Wave components 131 are recombined by a plurality of reflective elements within array 111, these elements directing the wave components along a path 133 to receiver transducer 107. Receiver transducer 107 converts the waveform information received along path 133 into an electrical signal. In a similar manner, transmitting transducer 115 and receiving transducer 117 cooperate with acoustic reflective arrays 119 and 121, transducer 117 converting the waveform information received along path 135 into an electrical signal.

When touchscreen 101 is touched by an object such as a stylus or finger, for example at a location 137, some of the energy in the acoustic x- and y-axis waveforms is absorbed. As a result of this attenuation, the waveform information received by transducers 107 and 117 is perturbed. Through analysis of the signals from the two receiving transducers, for example utilizing arrival time analysis, the x- and y-coordinates of the touch can be determined by processor 125.

Figure 2:
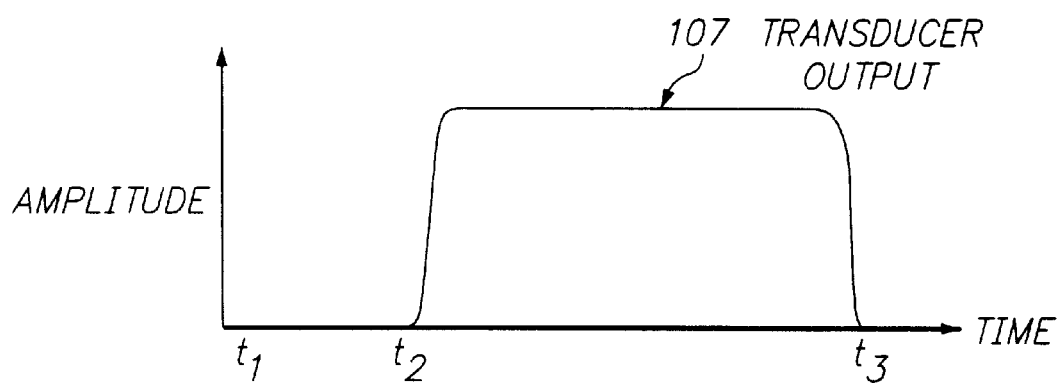
FIG. 2 is a graph illustrating a waveform as received by a surface acoustic wave transducer for one axis of a touchscreen according to the prior art.

FIG. 2 is a graph illustrating a typical time analysis of an unperturbed wave received by transducer 107, i.e., the situation in which there is currently no touch of surface 101. As shown, the amplitude of the received wave is plotted against time. At a time $t_1$, a signal is provided by a source to transducer 105. Time $t_2$ is the beginning of the waveform received by transducer 107. The time delay between $t_1$ and $t_2$ is due to the time delay between the wave launched by transducer 105 reaching a first reflective element of grating 109, traveling across the surface of panel 101, and being reflected by a first reflective element of grating 111. At time $t_3$, the last of the waveform reaches transducer 107. Due to the spacing and design of the reflective arrays, the amplitude of the curve between times $t_2$ and $t_3$ is relatively constant, assuming that the waveform is unperturbed as shown.

Figure 3:
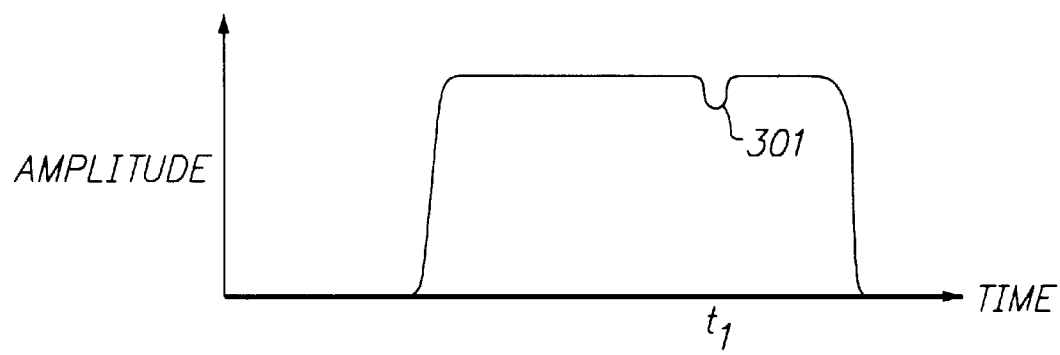
FIG. 3 is a graph of the waveform shown in FIG. 2 in which the waveform has been perturbed by a touch on the touchscreen.
Figure 4:
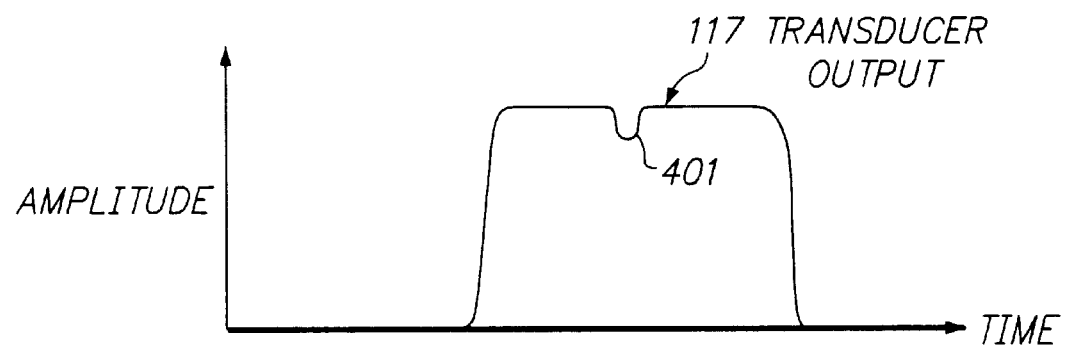
FIG. 4 is a graph of a perturbed waveform in an axis orthogonal to that shown in FIGS. 2 and 3.

FIG. 3 is a graph of a second waveform received by transducer 107. As shown, the amplitude of the waveform has a dip 301 at a time $t_r$. Dip 301 is due to waveform attenuation at location 137 of surface 101. By analyzing the time delay between $t_2$ and $t_r$, signal processing system 127 in conjunction with processor 125 is able to calculate the x-coordinate of touch 137. Similarly, processing system 125 and processor 127 in conjunction with transducers 115 and 117 and reflective arrays 119 and 121, are able to calculate the y-coordinate of touch 137. FIG. 4 is a graph of the waveform received by transducer 117 showing an attenuation dip 401 due to touch 137.

Figure 5:
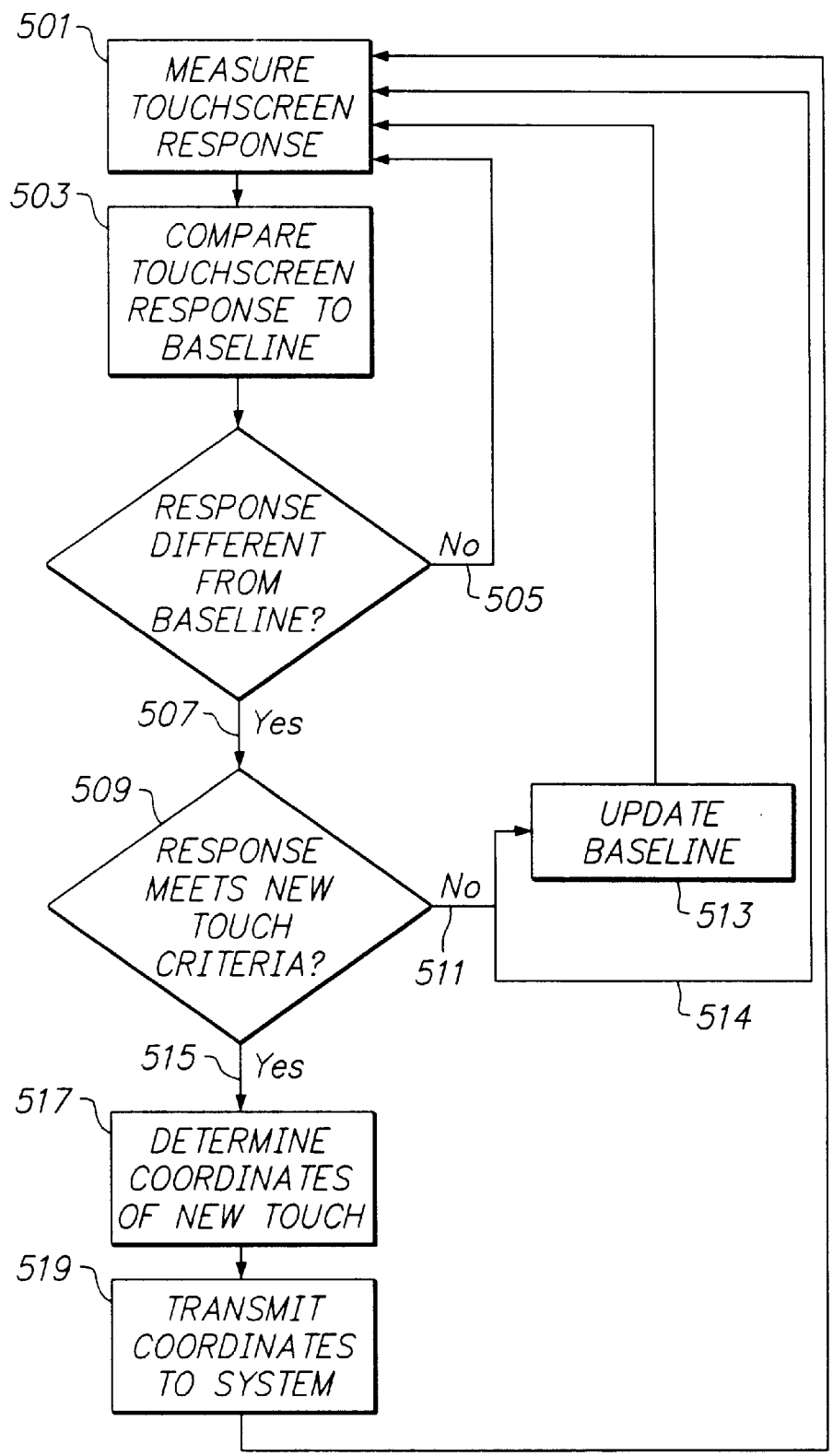
FIG. 5 is an overview flowchart of the algorithm typically used in a conventional acoustic touchscreen.

FIG. 5 is an overview flowchart of the algorithm typically used in a conventional acoustic touchscreen. Initially the touchscreen is in a new touch monitoring state (step 501). In this state the touchscreen periodically measures the waveform for one axis of the touchscreen, e.g., the x- or y-axis, and compares the measured waveform to a baseline waveform that is stored within the acoustic touchscreen operating system (step 503). If the measured waveform is not different from the baseline (step 505), the system loops back to the initial monitoring state. If it is determined that the measured waveform is different from the baseline (step 507), the system passes the measured waveform through a series of filters in order to validate the new response (step 509).

During the filtering step, if it is determined that the measured waveform does not meet the pre-set criteria for a new touch (step 511), the system returns to the initial monitoring state. Under certain circumstances the baseline waveform may be updated (step 513) prior to the system returning to the initial monitoring state, for example if the pre-set criteria comparison step determines that the measured waveform is due to a contaminant. Alternately, if the pre-set criteria comparison step determines that the measured waveform is due to noise, the system will not update the baseline waveforms but will return directly to the initial monitoring state (step 514). If the system determines that the measured waveform is a valid new touch (step 515), the coordinates of the new touch are determined (step 517), transmitted to the operating system (step 519), and then the system is returned to the initial monitoring state.

A variety of waveform filters can be used during step 509 to monitor for erroneous touches due to contaminants, system noise, etc. For example, the system can determine the size of the touch from the measured waveform. If the new touch is larger than a predetermined size, the system assumes that the touch is due to something other than a finger or stylus and invalidates the touch. An oversized touch may be due to the user resting a hand or arm against the touchscreen. Another type of filter can monitor the duration of the touch. Typically a user will only keep their finger or stylus on the acoustic touchscreen for a limited period of time. Thus if the duration of the touch is too long, the system invalidates the touch (step 511). Yet another type of filter that can be used during step 509 is one which monitors the position stability of the new touch. If the position of the touch remains absolutely constant, the system can be set to invalidate the touch, based on the assumption that a typical user will move at least a small amount.

The waveform shown in FIG. 2 is an example of a typical baseline waveform curve. Given such a baseline, a conventional system will register a new touch for the waveform shown in FIG. 3, assuming that the waveform for the orthogonal axis is also different from the baseline waveform for that axis and that the new touch waveform meets the new touch criteria used by the system.

Figure 6:
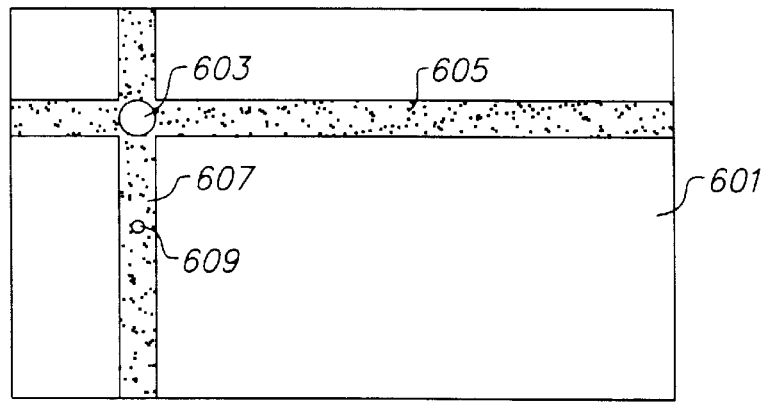
FIG. 6 is an illustration of the touch sensitive portion of an acoustic touchscreen that includes a contaminant.
Figure 7:
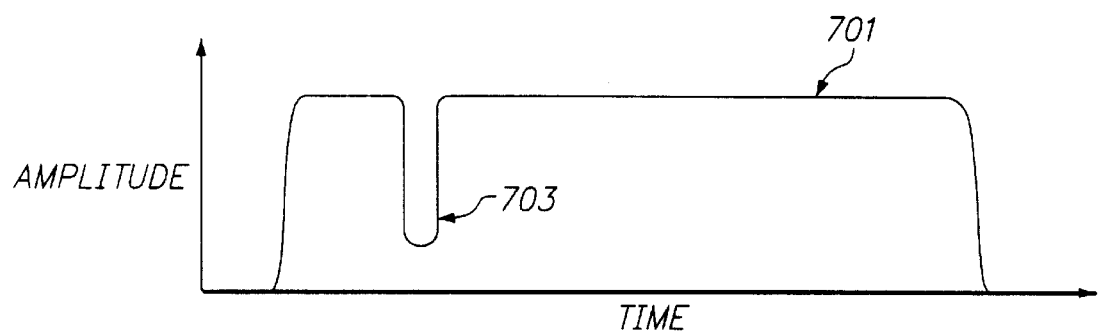
FIG. 7 is a graph illustrating a baseline waveform that has been updated to account for a contaminant on the surface of the touchscreen.

According to the prior art, and as illustrated in FIG. 5, when a contaminant alters the waveform measured by the touchscreen, the baseline information is updated (step 513). FIG. 6 is an illustration of the touch sensitive portion of an acoustic touchscreen 601 that includes a contaminant 603. According to the prior art, contaminant 603 will cause the touchscreen system to create a pair of shadow regions 605 and 607 that are the width of contaminant 603 and extend along the x- and y-axes as shown. Specifically, shadow regions 605 and 607 are created when the touchscreen system updates the baseline waveform. Thus assuming an initial baseline waveform as shown in FIG. 2, the updated baseline waveform due to contaminant 603 is shown in FIG. 7. As a consequence of contaminant 603, updated baseline waveform 701 includes a corresponding dip 703.

Figure 8:
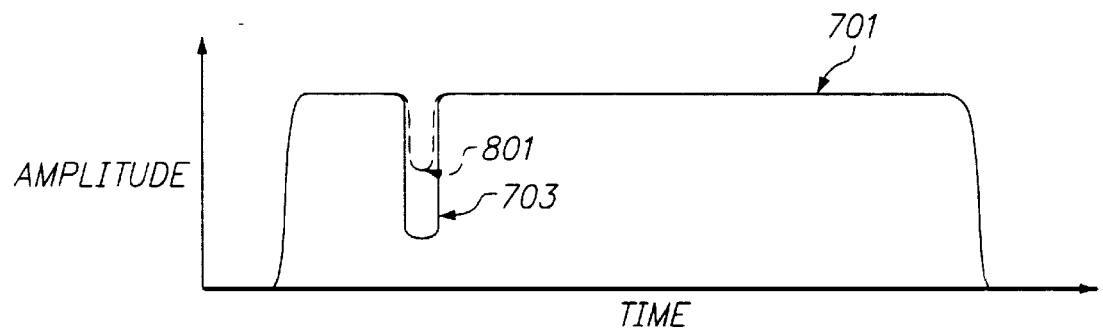
FIG. 8 is a graph illustrating a baseline waveform attenuation dip hiding the attenuation dip due to a valid touch.

During the initial touchscreen monitoring steps, the waveform measured for one axis of the touchscreen is periodically compared to the baseline waveform. Assuming a baseline waveform as shown in FIG. 7, a new touch occurring on touchscreen 601 at a location 609 will not be seen. As illustrated in FIG. 8, waveform dip 703 creates a shadow which hides the waveform dip that would otherwise be created by touch 609. If contaminant 603 did not exist, resulting in a baseline waveform such as that shown in FIG. 2, a touch at location 609 would create a waveform attenuation dip 801 (shown in phantom in FIG. 8). Similarly, shadow zone 605 will hide valid touches in a portion of the y-axis waveform.

As previously noted, in a conventional system the initial monitoring steps are typically performed in only one axis, i.e., either the x- or the y-axis. This approach is commonly used as it simplifies the initial processing steps, reducing the demand on processor resources and potentially leading to power savings. Even if, however, the system observes both axes during the initial monitoring steps, a touch occurring at location 609 would still be disregarded by a prior art system since such a system requires that the new waveform is different from the baseline waveform for both axes. The primary justification for such an approach is the assumption that a new touch which only registers in one axis must be due to noise or other system error. Unfortunately, although this approach does reduce false touches that are related to noise, it also creates a pair of shadow zones for each contaminant, thus significantly reducing the touch sensitive portion of the touchscreen.

Figure 9:
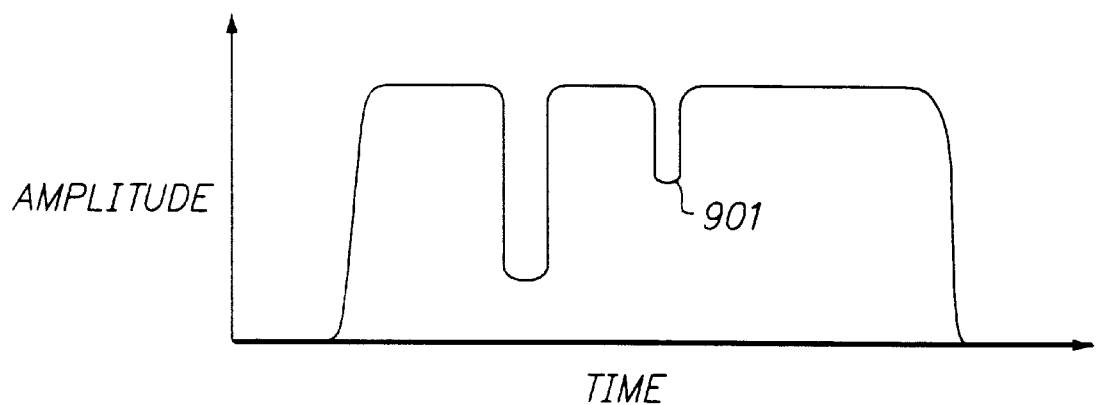
FIG. 9 is a graph illustrating a waveform measured for one axis of a touchscreen, the waveform showing an attenuation dip due to a contaminant as well as an attenuation dip due to a valid touch.
Figure 10:
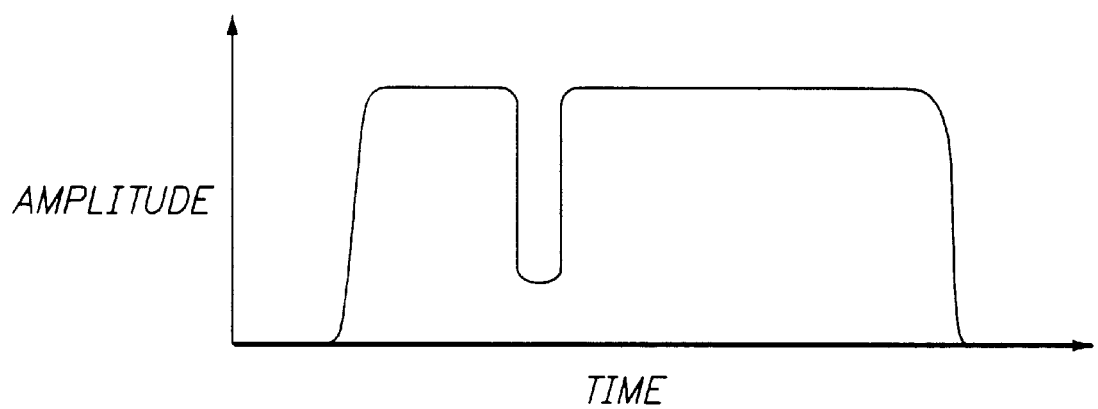
FIG. 10 is a graph illustrating the baseline waveform for the axis shown in FIG. 9.

According to the invention, if a new touch is determined to be valid in only one axis, it is still accepted as being from a valid new touch. For example, in accordance with the invention, a touch at location 609 would be registered as a new touch since the y-axis waveform, shown in FIG. 9, is different from the baseline waveform, shown in FIG. 10. The waveform for the x-axis is the same as that shown in FIG. 7 since the attenuation dip caused by the new touch is hidden, as previously illustrated in FIG. 8. Preferably in this example the x-axis coordinate is based on attenuation dip 703.

Figure 11B:
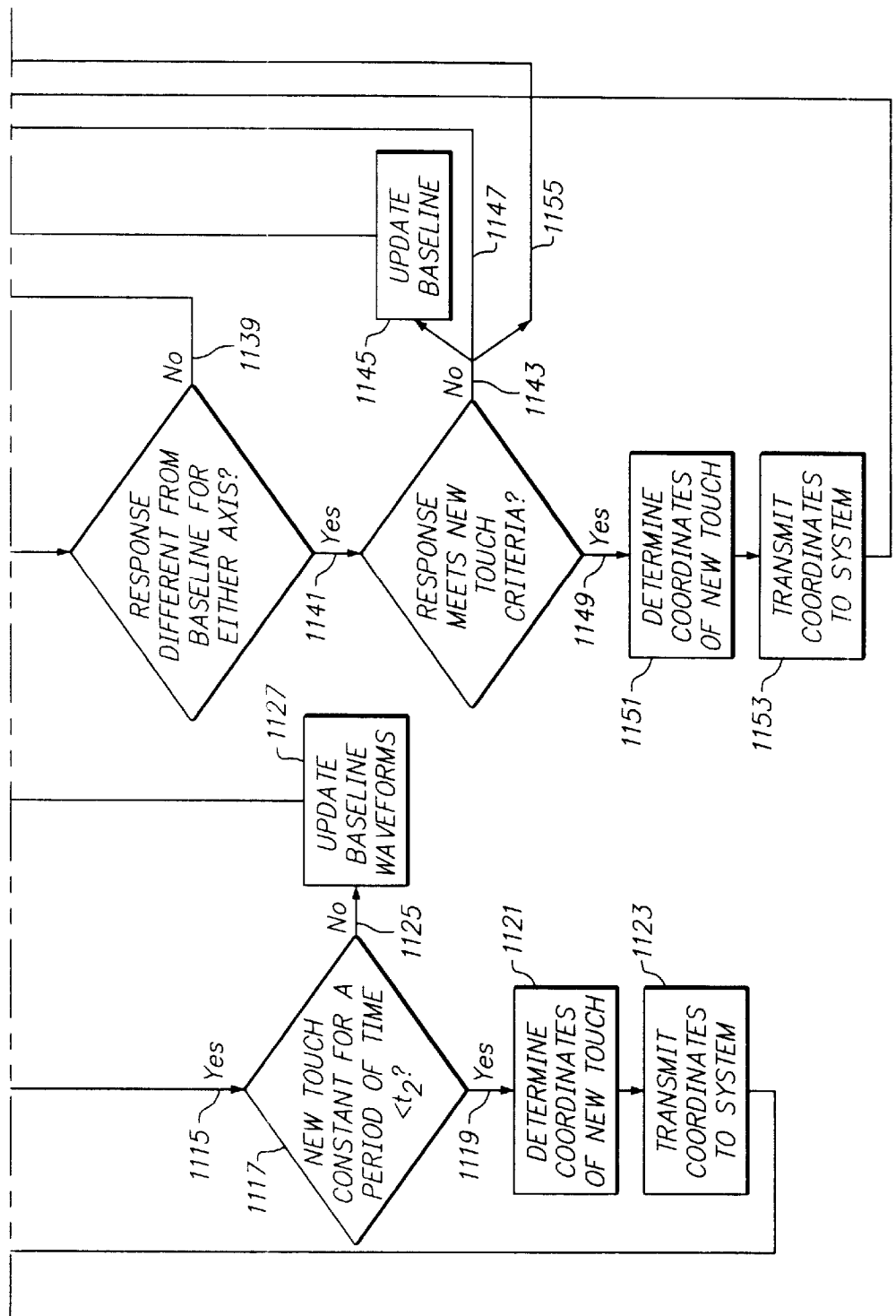
FIG. 11 is an overview flowchart of the algorithm used in an acoustic touchscreen according to the present invention.

FIG. 11 is an overview flowchart of the algorithm used in an acoustic touchscreen according to the present invention. Initially the system is in a new touch monitoring state (step 1101) which is the same as in a conventional touchscreen. At this point the baseline waveform for both axes shows no contamination dips, e.g., FIG. 2. As previously noted, periodically the touchscreen response is measured (step 1103) and compared to the baseline (step 1105). If the measured waveform is not different from the baseline (step 1107) the system loops back to the initial monitoring state. If it is determined that the measured waveform is different from the baseline (step 1109) the system preferably passes the measured waveform through a series of filters in order to validate the new response.

As previously noted, one typical filter determines whether the touch duration is longer than a preset value (step 1111). If the touch duration is too short, indicating noise, the system is returned to the initial monitoring state (step 1113). If the touch duration is longer that the preset value (step 1115) it is then compared to a second preset value (step 1117). If the touch duration is shorter than the second preset value (step 1119) the system determines the coordinates of the new touch (step 1121), transmits the coordinates to the operating system (step 1123), and then returns to the new touch monitoring state. If the touch duration is longer than the second preset value (step 1125), indicating a contaminant on the surface of the touchscreen, the baseline waveforms are updated (step 1127). Once the baseline waveforms have been updated to reflect the surface contaminant, the touch monitoring algorithm is modified in accordance with the present invention.

After the touchscreen surface has been contaminated and the baseline waveforms have been updated, the system enters a touch monitoring state (step 1129) in which the waveforms corresponding to each axis for each new touch are compared to the baseline waveforms for each axis. In this touch monitoring state, initially the waveform for one axis of the touchscreen is measured (step 1131) and compared to the baseline waveform for that axis (step 1133). Regardless of whether or not the new waveform is different from the baseline waveform, the waveform for the second axis is measured (step 1135) and compared to the baseline waveform for the second axis (step 1137). As in the prior art algorithm, the monitoring steps are periodically performed.

If the measured waveform for both axes are equivalent to the baseline waveforms (step 1139), the system loops back to the initial monitoring state. If at least one of the measured waveforms is different from the corresponding baseline waveform (step 1141), preferably the system passes the measured waveforms through one or more filters in order to validate the new response (step 1143).

During the filtering step, if it is determined that the measured waveform does not meet the pre-set criteria for a new touch (step 1143) the system returns to the initial monitoring state. Note that depending upon the pre-set criteria used during this step, the baseline waveforms may be updated (step 1145). For example, if the duration of the touch is longer than a preset value, the touch is assumed to be due to a new contaminant and the baseline waveforms are updated (step 1145). Alternately, if the duration of the touch is shorter than a second preset value, the touch is assumed to be due to noise and the baseline waveforms are not updated (step 1147). If the system validates the newly measured waveforms (step 1149), the coordinates of the new touch are determined (step 1151), transmitted to the operating system (step 1153), and then the system is returned to the monitoring state.

Preferably one of the filters used compares the new waveforms to the original baseline waveforms, i.e., the waveforms for a non-contaminated touchscreen surface. If it is determined that the new waveforms are equivalent or substantially equivalent to the original baseline waveforms, thus indicating that the contaminant is no longer on the surface of the touchscreen (e.g., contaminant physically removed, fell off, etc.), the system goes back to the original new touch monitoring state (step 1155). Alternately, the system can determine whether the new touch is a negative touch located at the coordinates of the contaminant for each axis, once again indicating that the contaminant has been removed from the surface, thus allowing the system to go back to the original new touch monitoring state (step 1155).

It will be understood by those of skill in the art that coordinate determining step 1151 can be performed at other times within the algorithm without departing from the invention. For example, the first axis coordinate of the new touch can be determined either prior to or after step 1133. Similarly, the second axis coordinate of the new touch can be determined either prior to or after step 1137. Alternately, the coordinates for both axes of the new touch can be determined either prior to or after step 1137. Alternately, the coordinates for both axes of the new touch can be determined after it has been determined that a new touch has been registered (step 1141).

In accordance with the invention, if the new touch is located within the shadow created by a contaminant in only one axis, e.g., touch 609 shown in FIG. 6, the system is still able to determine both the x- and y-coordinates of the touch. The touch coordinate for one axis, specifically the unshadowed coordinate, is determined in accordance with the prior art by comparing the new waveform with the baseline waveform. The touch coordinate for the second axis, specifically the shadowed coordinate, utilizes the baseline waveform in determining the touch coordinate. Thus in the example shown in FIG. 6 and the corresponding waveforms shown in FIGS. 8 and 9, the y-axis coordinate is derived from attenuation dip 901 due to the new touch while the x-axis coordinate is derived from attenuation dip 703 due to contaminant 603.

It will be understood by those of skill in the art that the baseline waveform information can be stored within the acoustic operating system in a variety of ways without departing from the invention. For example, this information can be stored as a waveform. Alternately, the information can be stored as a plurality of discrete coordinate pairs that comprise the waveform.

Figure 12:
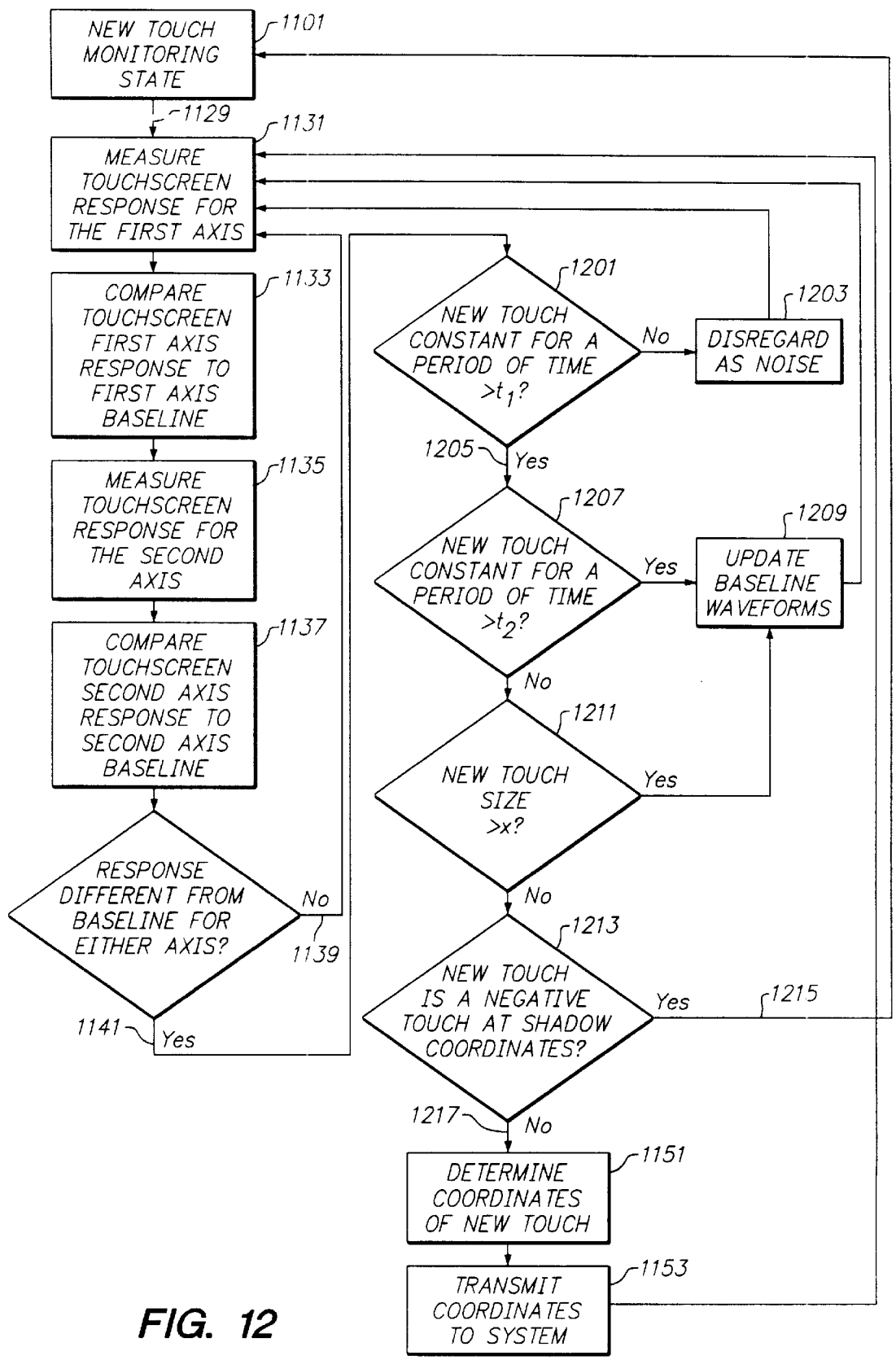
FIG. 12 is a flowchart for a specific embodiment of the invention.

FIG. 12 is a flowchart for a portion of a specific embodiment of the invention. This embodiment assumes that the initial portion of the touch sensing system is identical to steps 1101–1129 of FIG. 11, as indicated by the dotted line coupling steps 1101 to 1131. Additionally steps 1131–1141, although shown in this figure, are identical to the matching steps of FIG. 11. After step 1141, the new touch is monitored to determine whether or not it remains constant for a period of time greater than some predetermined time, ti (step 1201).

If the new touch is not constant for at least time $t_1$, the new touch is assumed to be due to transient electrical noise within the system and the touch is disregarded (step 1203) and the system is returned to the monitoring state indicated by step 1131. If the new touch remains constant for a period of time greater than predetermined time $t_1$ (step 1205), a determination is made as to whether or not the new touch is constant for a period of time greater than predetermined time $t_2$ (step 1207). If the new touch remains constant for too great of period of time, i.e., greater than time $t_2$, the new touch is assumed to be due to a contaminant. In this case the baseline data is updated (step 1209) and the system is returned to the monitoring state.

If the new touch remains constant for a period of time between $t_1$ and $t_2$, the size of the touch is determined and compared to a predetermined size, x (step 1211). If the size, e.g., touch area, is determined to be too large, the new touch is disregarded and assumed to be due to a contaminant or other foreign body. As a consequence, the baseline data is updated (step 1209) and the system is returned to the monitoring state. If the touch is smaller than the predetermined size, the system determines whether the new touch is a negative touch located at the coordinates of the shadow for each axis (step 1213). If it is determined that the touch is a negative touch with coordinates matching those of the contaminant, the system returns to the initial monitoring state (step 1215). If the touch is not a negative touch (step 1217), the system determines the coordinates of the new touch (step 1151) and transmits the coordinates to the operating system (step 1153). The system is then returned to the monitoring state (step 1219).

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A method of operating an acoustic wave touchscreen, comprising the steps of:

periodically measuring a first waveform for a first axis of said touchscreen and a second waveform for a second axis of said touchscreen;

comparing said first waveform to a first baseline waveform;

determining if said first waveform and said first baseline waveform are substantially equivalent;

comparing said second waveform to a second baseline waveform;

determining if said second waveform and said second baseline waveform are substantially equivalent;

returning to an initial monitoring state if said first waveform and said first baseline waveform are substantially equivalent and if said second waveform and said second baseline waveform are substantially equivalent; and establishing a new touch if said first waveform and said first baseline waveform are not substantially equivalent or if said second waveform and said second baseline waveform are not substantially equivalent.

2. The method according to claim 1, further comprising the steps of:

measuring a duration of said new touch;

validating said new touch if said duration is greater than a predetermined duration; and invalidating said new touch if said duration is less than said predetermined duration.

3. The method according to claim 1, further comprising the steps of:

measuring a duration of said new touch;

validating said new touch if said duration is less than a predetermined duration; and invalidating said new touch if said duration is greater than said predetermined duration.

4. The method according to claim 3, further comprising the steps of:

replacing said first baseline waveform with said first waveform if said first waveform and said first baseline waveform are not substantially equivalent and if said new touch is invalidated; and replacing said second baseline waveform with said second waveform if said second waveform and said second baseline waveform are not substantially equivalent and if said new touch is invalidated.

5. The method according to claim 1, further comprising the steps of:

measuring a touch size corresponding to said new touch;

validating said new touch if said touch size is less than a predetermined size; and invalidating said new touch if said touch size is greater than said predetermined size.

6. The method according to claim 5, further comprising the steps of:

replacing said first baseline waveform with said first waveform if said first waveform and said first baseline waveform are not substantially equivalent and if said new touch is invalidated; and replacing said second baseline waveform with said second waveform if said second waveform and said second baseline waveform are not substantially equivalent and if said new touch is invalidated.

7. The method according to claim 1, further comprising the step of computing a pair of coordinates for said new touch.

8. The method according to claim 7, further comprising the step of transmitting said first pair of coordinates to a touchscreen operating system.

9. The method according to claim 1, wherein said first baseline waveform includes at least one attenuation dip, and wherein said second baseline waveform includes at least one attenuation dip.

10. A method of operating an acoustic wave touchscreen, comprising the steps of:

periodically measuring a first waveform for a first axis of said touchscreen and a second waveform for a second axis of said touchscreen;

comparing said first waveform to a first baseline waveform, wherein said first baseline waveform includes at least one attenuation dip;

determining if said first waveform and said first baseline waveform are substantially equivalent;

comparing said second waveform to a second baseline waveform, wherein said second baseline waveform includes at least one attenuation dip;

determining if said second waveform and said second baseline waveform are substantially equivalent;

returning to an initial monitoring state if said first waveform and said first baseline waveform are substantially equivalent and if said second waveform and said second baseline waveform are substantially equivalent;

establishing a new touch if said first waveform and said first baseline waveform are not substantially equivalent and if said second waveform and said second baseline waveform are substantially equivalent;

determining a waveform difference between said first waveform and said first baseline waveform;

determining a first axis touch coordinate from said waveform difference; and determining a second axis touch coordinate based on said second axis attenuation dip.

11. The method according to claim 10, further comprising the steps of:

measuring a duration of said new touch;

validating said new touch if said duration is greater than a predetermined duration; and invalidating said new touch if said duration is less than said predetermined duration.

12. The method according to claim 10, further comprising the steps of:

measuring a duration of said new touch;

validating said new touch if said duration is less than a predetermined duration; and invalidating said new touch if said duration is greater than said predetermined duration.

13. The method according to claim 12, further comprising the steps of replacing said first baseline waveform with said first waveform if said first waveform and said first baseline waveform are not substantially equivalent and if said new touch is invalidated.

14. The method according to claim 10, further comprising the steps of:

measuring a touch size corresponding to said new touch;

validating said new touch if said touch size is less than a predetermined size; and invalidating said new touch if said touch size is greater than said predetermined size.

15. The method according to claim 14, further comprising the steps of replacing said first baseline waveform with said first waveform if said first waveform and said first baseline waveform are not substantially equivalent and if said new touch is invalidated.

* * * * *